T. ROSS.
PENDULUM.
APPLICATION FILED MAY 29, 1914.
1,130,435.
Patented Mar. 2, 1915.
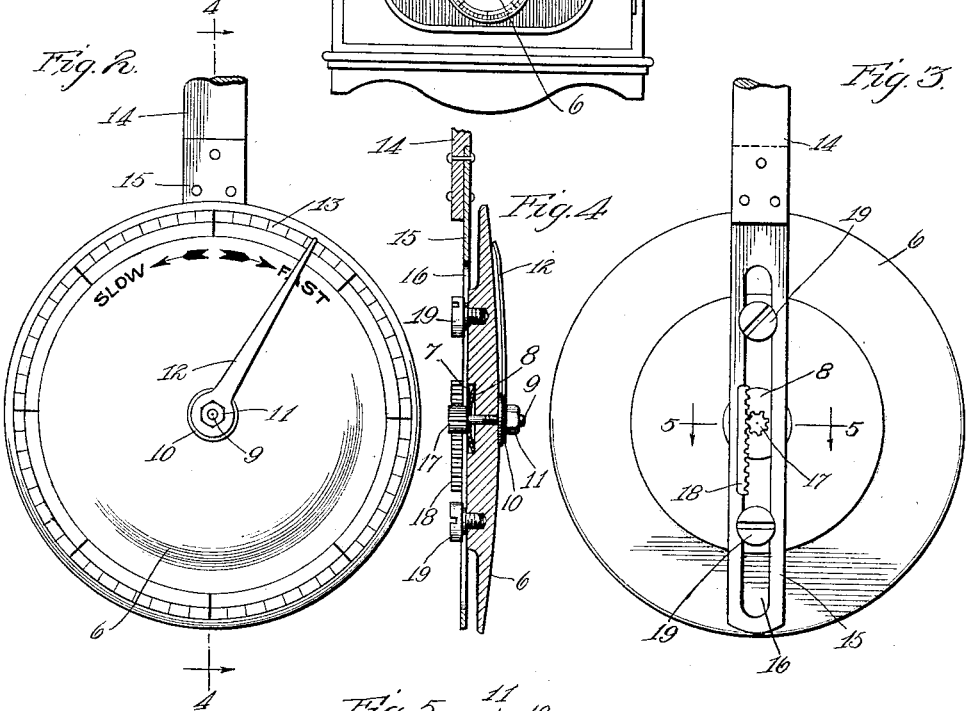

UNITED STATES PATENT OFFICE.

TOREY ROSS, OF CHICAGO, ILLINOIS.

PENDULUM.

1,130,435.     Specification of Letters Patent.     Patented Mar. 2, 1915.

Application filed May 29, 1914. Serial No. 841,703.

*To all whom it may concern:*

Be it known that I, TOREY ROSS, a citizen of the United States of America, and a resident of Chicago, county of Cook, and State of Illinois, have invented certain new and useful Improvements in Pendulums, of which the following is a specification.

My invention relates to pendulum adjustment for clocks and has for its object improvements in such devices.

In the accompanying drawings Figure 1 is the front elevation of a clock showing a pendulum having my improvements; Fig. 2 is an enlarged front elevation of the bob and a portion of the pendulum rod; Fig. 3 is a rear elevation of Fig. 2; Fig. 4 is a section on line 4—4 of Fig. 2; and Fig. 5 is an enlarged detail.

The bob 6 has a finished rear face and a central rear recess 7 in which is located a spring washer 8. Extending through the center of the bob is a bolt or spindle 9, the head of which is in the form of a pinion 17 bearing against the outer face of the washer 8. A nut 10 and lock nut 11 serve to compress the washer 8 to produce any desired degree of frictional resistance to the turning of the spindle or bolt 9. The nut 10 is a built up nut, one part of which consists of a hand or pointer 12 which extends over a graduated scale 13 on the front face of the bob 6.

The lower end of the pendulum rod 14 consists of a flat bar 15 having a slot 16 through which the pinion 17 extends to engage a rack 18 secured on the outer rear face of the bar 15. The bar 15 is secured in its proper relationship to the pinion 17 by means of shouldered screws 19 which pass through the slot 16 into the finished rear face of the bob 6. These screws 19 do not clamp the bar 15 and the bob 6 together, but permit a free sliding of one upon the other so that the weight of the bob rests solely on the rack 18 by engagement of the teeth of the pinion therewith.

The pinion 17 and the washer 8 may be secured together by brazing or otherwise, and are preferably so connected. With the nut 10 screwed down to put a moderate amount of tension upon the washer 8, and the lock nut screwed tight against the nut 10, it will be evident that the parts 8, 9, 10, 11, 12 and 17 are in effect one piece which may be turned by hand but which furnishes frictional resistance to such turning. It will also be evident that by manually moving the hand or arm 12 over the dial 13 the bob will be raised or lowered to make the clock run faster or slower. It will be further evident that by reason of the looseness of the connection between the bob and the bar 15 there will be no lost motion in raising or lowering the bob but that its weight will always rest directly on the teeth of the rack 18.

The graduations on the dial 13 have a definite relationship to the pitch circumference of the pinion and the mathematically perfect length of pendulum on which they are to be used. This relationship is such that upon moving the hand 12 a distance corresponding to the distance between two adjacent long graduation marks on the dial the clock will run faster or slower by the amount of one minute per day. The finer graduations are preferably one-eighth of the coarser graduations with the result that upon a manual adjustment of the hand 12 a distance corresponding to the distance between two marks on the finer scale the clock will run faster or slower by the amount of one minute in eight days.

What I claim is:

1. The combination with a pendulum and a bob having a loose sliding connection with each other, of a rack and pinion by which the bob is raised and lowered on the rod, said rack and pinion being so arranged that the weight of the bob is at all times supported by contact between the teeth of said rack and pinion, from turning under the weight of the bob, a manually operated device connected to the pinion by which it may be turned to adjust the bob on the rod, and an indicator for such adjustment.

2. The combination with a pendulum rod and a bob, of a rack secured to the rod, a pinion having a bearing in the bob, manually operated means for turning said pinion to move the bob on the rod, and a frictional connection serving to restrain the pinion from turning when the weight of the bob is supported on the teeth of the rack.

3. The combination with a pendulum rod and a bob, of a rack secured to the rod, a pinion supported on the teeth of the rack and having a bearing in the bob, a spring washer secured to the pinion and engaging the bob to furnish resistance to turning the pinion in its bearing, means for adjusting the tension of the washer to vary the frictional resistance, means by which the pinion may be manually adjusted, and a scale for indicating the amount of such adjustment.

4. The combination with a pendulum rod and a bob, of a rack secured to the rod, an axial shaft extending through the bob and having a pinion engaging the rack, a spring washer between the pinion and the bob, a nut by which the washer is put under tension, an indicating hand secured to the shaft and located adjacent to the front face of the bob, and a scale in the path of the hand.

Signed at Chicago, Illinois, this 27th day of May, 1914.

TOREY ROSS.

Witnesses:
C. L. REDFIELD,
JAMES C. REDFIELD.

Copies of this patent may be obtained for five cents each, by addressing the "Commissioner of Patents, Washington, D. C."